C. E. HOLLAND.
PROCESS OF RECOVERING COAL, HELD IN SUSPENSION, FROM COAL BEARING WATER AND STREAMS.
APPLICATION FILED NOV. 13, 1920.
1,397,735. Patented Nov. 22, 1921.
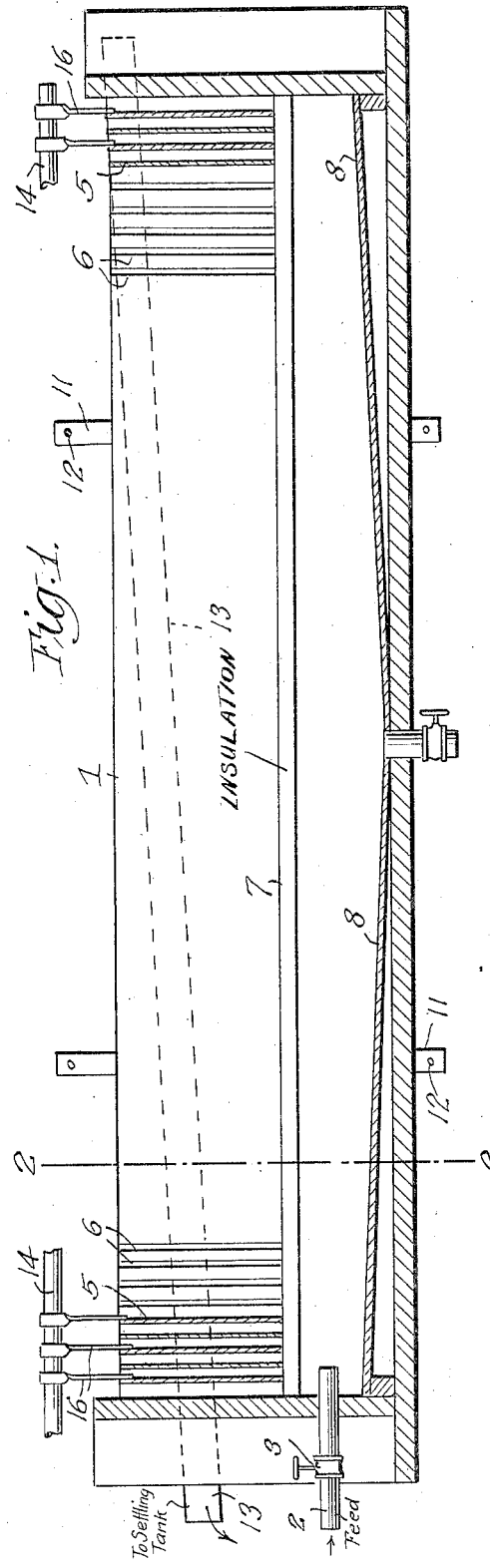
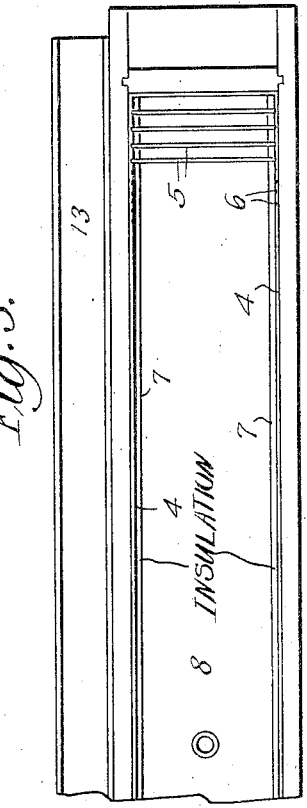
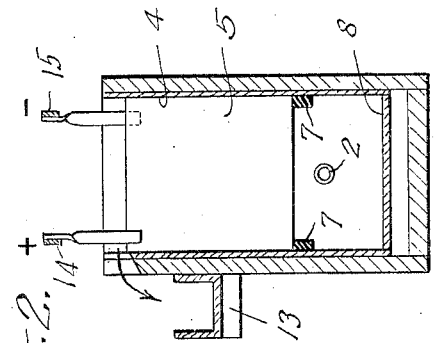
INVENTOR
Charles Edwin Holland.
BY
Cornelius C. Billings
his ATTORNEY

UNITED STATES PATENT OFFICE.

CHARLES EDWIN HOLLAND, OF BROOKLYN, NEW YORK.

PROCESS OF RECOVERING COAL, HELD IN SUSPENSION, FROM COAL-BEARING WATER AND STREAMS.

1,397,735.     Specification of Letters Patent.     Patented Nov. 22, 1921.

Application filed November 13, 1920. Serial No. 423,810.

*To all whom it may concern:*

Be it known that I, CHARLES EDWIN HOLLAND, a citizen of the United States, and a resident of the borough of Brooklyn, county of Kings, city and State of New York, have invented certain new and useful Improvements in Processes of Recovering Coal, Held in Suspension, from Coal-Bearing Water and Streams, of which the following is a specification.

My invention concerns a process for reclaiming and recovering coal from water or other liquids in which the particles of the said coal are suspended in such fine comminution that it is impossible to recover the same in sedimentation or other mechanical separation.

In particular my process is intended for the treatment of waters or creeks draining coal mining districts.

I find that waters of this character carry in suspension in fine minute particles an average of 15 lbs. of high grade coal to a ton of water, which particles, on account of their extremely fine state of division, have never been recovered heretofore, and consequently are a total loss.

My process recovers coal from waters of the character described by subjecting the said waters to electrolytic action, whereby the suspended particles of coal contained therein are coagulated and precipitated in conjunction with organic and inorganic matter other than metal, such as hydrocarbons or the like, also contained in the said waters.

I am thus enabled to make available for use a large quantity of valuable material which up to the present has been an absolute loss. In addition my process clarifies the water by the elimination of the coal and other hydrocarbon products present therein, and thus eliminates the continued pollution of streams and the other disadvantages arising from the presence of the particles of coal in the mine waters.

Furthermore, my process lends itself to installation on any desired scale and the product obtained thereby is in a condition to be available for use as fuel, particularly for installations which operate with powdered coal.

As my product is obtained in pulverized form suitable for such use, the complicated and costly machinery now necessary for the preparation and pulverizing of coal previous to its use as a fuel is done away with. Consequently, the smaller manufacturing plants and factories may all avail themselves of the economy of pulverized coal for fuel use which is not otherwise available to them because of present prohibitive cost of necessary pulverizing machinery and installations.

A suitable apparatus for carrying out my invention is illustrated in the accompanying drawings, it being understood, however, that my invention can be practised in any suitable type of electrolytic apparatus.

In the drawings:

Figure 1 is a longitudinal cross section of an electrolytic apparatus, suitable for the purpose of practising my invention.

Fig. 2 is a cross section at right angles to Fig. 1 along the line 2—2 of Fig. 1.

Fig. 3 is a plan view of my apparatus, partially broken away.

Fig. 4 is a detail of construction, showing the method of supporting the electrodes in the insulated lining of the tank.

The same reference characters indicate the same parts in the several views.

In carrying out my process the coal bearing water to be treated is preferably conducted to a suitable reservoir (not shown) and from said reservoir into an electrolyzing tank 1. The water enters the tank 1 through pipe 2, the flow of the liquid being regulated by means of the valve 3. The tank 1 is provided with a lining 4 of hard rubber, glass or any other suitable insulating material. Disposed within said tank are a series of electrode plates 5 of any suitable metal or carbon. The said plates 5 are suitably spaced apart and held in position by being inserted into vertical slots 6 provided in the insulating lining, as shown in Fig. 4. In the interest of clearness the slots 6 are also illustrated at the ends only for a short distance in Figs. 1 and 3. They are supported at the bottom by strips 7 of hard rubber or any suitable insulating material attached to the side walls of the tank 1 at a suitable distance above the bottom thereof. The tank 1 is provided with a false bottom 8 sloping from both sides toward the middle. A drain pipe 9 controlled by a suitable valve 10 serves to drain the contents of the tank when desired, or remove precipitated matter therefrom. In order to strengthen the tank 1, vertically disposed strips 11 are arranged on the sides thereof and held together in the usual manner by the rods 12. The upper portion of one of the side walls is cut away for a certain distance, so that the tank can overflow into a sloping overflow pipe 13, which pipe carries the treated liquid to suitable tanks not shown and, if necessary filter-presses (not shown).

Disposed longitudinally above the tank 1 are two bus bars 14 and 15, the bus bar 14 being connected to the positive pole, and the bus bar 15 to the negative pole of a suitable source of electricity. Electrical connection between the plates 5 and the bus bars is made by means of the conducting strips 16 in such a manner that successive plates are of opposite polarity.

In the practice of my invention the water to be treated enters through the pipe 2 at the bottom of the electrolyzing tank 1, the flow of the same being suitably regulated by means of the valve 3, and overflows at the top of the tank into the overflow pipe 13. During its passage through the tank 1 it is subjected to an electrolyzing action between the electrode plates 5, which electrolyzing action causes the fine particles of coal and other carbonaceous material present and normally suspended in the said liquid to become coagulated and assume such physical condition that the same may be easily recovered therefrom, partly as precipitated matter from the tank itself and partly from the overflow.

It is obvious that the current densities to be employed at the time of treatment depend upon the composition of the electrodes as to conductivity, spacing of the same and the composition or nature of the electrolyte being treated. As an illustration it may be mentioned that I have found in the practice of my invention upon the coal laden waters of three different creeks in the anthracite district of the State of Pennsylvania that the required action was instantly obtained, the current densities varying from approximately three to five volts, and one to one and one-half amperes per square foot of electrode surface.

It is to be distinctly understood however that a change in any of these factors does not modify the invention herein described and claimed.

In this manner I am enabled to recover from water or liquid a product which can be directly used in place of the powdered or pulverized coal now used for that purpose, because the said coal in order to be suitable for fuel purposes must be pulverized by mechanical means to the proper size, namely 150 mesh or finer. I am thus enabled to do away with the disadvantage resulting from the necessity of the installation of complicated and expensive machinery necessary for the fine pulverization of the coal, which fact heretofore has limited the use of powdered coal as fuel to a comparatively limited number of large industrial plants. As my process lends itself also to installations on a small scale, it makes the use of finely powdered fuel with its attending economy available also to the great number of industrial plants of smaller size, and enables the small manufacturer to realize all the advantages in getting a very high percentage of fuel efficiency which was heretofore only available to the large plants.

Moreover, my improved process clarifies the water by the elimination of the coal and other organic substances carried in suspension therein and thus effectively does away with the disadvantages arising from the pollution of streams, which is largely prevalent in the coal mining regions, and which is a serious economic disadvantage.

Having thus described my invention what I claim as new and desire to secure by Letters Patent is:

1. The process of recovering coal from water or other liquid which consists in coagulating and precipitating the coal and organic matter in the liquid, and separating the coagulum and precipitate from the liquid.

2. The process of recovering coal and organic material held in suspension in water, which consists in subjecting the water to electrolysis, whereby a coagulum and a precipitate are formed from the said coal and organic material held in suspension therein, and separating the coagulum and precipitate from the water.

3. The process of recovering coal and organic material from water, holding such material in fine suspension, which consists in subjecting a body of the said water to electrolysis, whereby a coagulum and a precipitate are formed from the said coal and organic material, removing the coagulum and precipitate from the water and drying the same.

4. The process of recovering coal and organic material held in suspension in water, which consists in passing such water continuously through a tank, subjecting the water as it passes through the tank to electrolysis, whereby a coagulum and a precipitate are formed from the said coal and other organic matter, removing the coagulum and precipitate from the water and drying the same.

5. The process of reclaiming coal and organic material held in suspension in water, which consists in passing such water continuously through a tank, subjecting the water as it passes through the tank to electrolysis, whereby a coagulum and a precipitate are formed from the said coal and other organic matter, permitting the coagulum and precipitate to flow out of the tank with the water and removing the same therefrom by sedimentation and filter pressing, and drying the product thus obtained.

In witness whereof, I have hereunto set my hand at the borough of Manhattan, city and State of New York, this 10th day of November, 1920.

CHARLES EDWIN HOLLAND.